United States Patent Office 3,010,792
Patented Nov. 28, 1961

3,010,792
PREPARATION OF INDIUM PHOSPHIDE
Rostislav Didchenko, Cleveland, Ohio, assignor to Union Carbide Corporation, a corporation of New York
No Drawing. Filed Aug. 31, 1959, Ser. No. 836,926
6 Claims. (Cl. 23—204)

This invention relates to a process of preparing indium phosphide and it more particularly relates to a process for the preparation of indium phosphide of high purity.

Indium phosphide is potentially an extremely important compound. It is one of the so-called III–V compounds which shows great promise in the electronics field because it is a semi-conductor when prepared in the very pure state. The III–V compounds are so called because they are composed of elements from groups III and V of the periodic table. According to the periodic table appearing on page 665 of Outlines of Physical Chemistry, by Farrington Daniels, seventh printing of the first edition, the "III" materials of interest are boron, aluminum, gallium, indium and thallium, and the "V" materials of interest are nitrogen, phosphorus, arsenic, antimony and bismuth.

Compounds of the III–V class, particularly indium phosphide have been made by reacting the elemental constituents thereof at high temperatures in sealed containers. In the case of indium phosphide, the reaction is slow unless run at temperatures of about 1000° C. at which temperature high pressures up to 40 atmospheres are necessary to obtain yields of stoichiometrically proportioned compound. Apart from the difficulties imposed by these relatively severe reaction conditions, and in particular the difficulty of working at such high pressures, a more serious disadvantage of this conventional process is that phosphorus attacks quartz, the usual reactor material, after prolonged exposure at this temperature. It is therefore difficult to prepare large amounts of indium phosphide, of a purity sufficient to permit the use of this material in semiconductor application, by the techniques generally in use in the art today. Furthermore, it is very difficult to purify some of the elemental reactants, especially phosphorus, to the degree required in the final material. It is, therefore, advantageous to use a process which utilizes compounds as starting materials rather than elements, if these compounds are more amenable to extensive purification. This becomes especially important if the final material, as in the case of indium phosphide, is nearly impossible to purify, for example, by zone refining.

It is therefore the primary object of this invention to provide a process for the preparation of indium phosphide which utilizes reactants which are readily purified.

It is another object of this invention to provide such a process which operates at relatively low temperatures.

It is a further object of this invention to provide such a process wherein the reaction products other than indium phosphide are volatile.

Fulfilling these objects, this invention resides in the process of preparing indium phosphide which comprises reacting phosphine with an organic indium compound at a temperature less than 300° C. in a reaction vessel; removing the reaction products other than indium phosphide; and recovering the indium phosphide. As used in the specification and in the claims appended thereto, the term organic indium compound is meant to encompass those organic compounds of indium which, when hydrogen is substituted for indium, are themselves volatile or decompose into volatile materials at or below the reaction temperature of the organic indium compound and phosphine, usually less than 300° C.

The process generally described above realizes the needs, also expressed above, with regard to the preparation of III–V compounds, especially those which are utilized as semiconductors. Because the reactants are compounds, they may be readily purified by methods which are not adapted to use with elemental materials. Also, it is not necessary to purify the final product if the reacting compounds are relatively pure since the resulting compound's purity is directly related to that of the reactants. Another advantage to the process described above is that the reaction proceeds smoothly at a good rate at relatively low temperatures in comparison with the reaction rate and temperature of elemental phosphorus and indium. The reaction temperature will depend upon the organic indium compound used in each case, but in no event should it be necessary to proceed at a temperature much higher than 300° C.

More specifically, indium phosphide may be prepared by reacting phosphine with indium salts of alkyl, carboxylic acid or enolic organic compounds. Several acidic salts which fulfill this description are indium formate, indium acetate, indium oxalate, and indium propionate. This class of compounds generally fit into the structural formula:

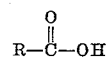

with the indium adding in place of the acidic hydrogen. The enolic compounds may be represented by indium acetylacetonate and other dione compounds whose carbonyl oxygens are placed at $n$ and $n+2$ positions, where "$n$" is the number of carbon atoms from either end of the molecule. The latter compounds may be fitted into the structural formula which in its enolic tautomeric form is capable of chelating with the indium ion to form a six membered ring:

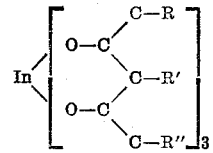

The R, R', and R" radicals may be any convenient group. The alkyl compounds may be represented by trimethyl indium for example and generally fit into the generic formula

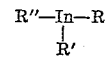

where R, R' and R" each may represent hydrogen or alkyl chains. The only requirement of these classes of compounds, either alkyl, acidic or enolic, is that the reactant chosen react with phosphine below 300° C. to form indium phosphide and other reaction products and that all of these other reaction products are volatile or decompose into volatiles at or below 300° C. These same conditions of reaction and volatilization at or below 300° C. can be met by many other organic indium compounds and all such compounds are adapted to use in this invention. The alkyl, enolic and acidic compounds have been specifically disclosed herein since they seem to work best.

One minor modification of the process above described, in the case of indium formate is necessitated by the fact that this material is not as amenable to extensive purification as other compounds. In other to obtain very pure indium formate, it is therefore necessary to prepare another salt and purify it and then react it with formic acid to produce the indium formate. Since indium formate reacts rapidly with phosphine at 120° C. to 230° C., it is the most desirable reactant of those disclosed. The roundabout purification necessary for this compound is therefore tolerated because of the smooth and rapid reaction thereof with phosphine. Suitably indium acetylacetonate is made and purified and then reacted with formic acid to produce indium formate which is subsequently reacted with phosphine to prepare indium phosphide.

While indium acetylacetonate reacts with phosphine to form indium phosphide at a temperature between 150° C. and 250° C., it is not as desirable a reactant as the formate because the reaction rate thereof with phosphine is much slower. Similarly, the oxalate will also react to form indium phosphide but the reaction proceeds rather slowly unless the temperature is raised to about 300° C. and maintained there for a time sufficient to complete the reaction. Extensively prolonged retention at this temperature tends to decompose phosphine and so this reactant, while it also will form indium phosphide on reaction with phosphine, is not as desirable as indium formate.

A modified process must be used when reacting alkyl indium compounds and phosphine to produce indium phosphide. As the rate of formation of indium phosphide from these compounds is high, approaching explosive proportions, care must be exercized to keep the reaction under control. In order to minimize these dangerous reaction rates, the alkyl indium compound may be dissolved in a suitable solvent, such as benzene or toluene, for example, and phosphine bubbled through the solution thus forming a precipitated reaction product which is heated to an elevated temperature below about 300° C. to form indium phosphide. The merits and faults of any individual organic indium compound are well within the knowledge of most chemists and the choice of the particularly appropriate material for any given reaction conditions is left to those skilled in the art. So long as the reactant chosen meets the requirements set forth above, it is intended to be encompassed by this disclosure.

The following may be cited as specific examples of the practice of this invention.

Example I

Indium oxalate was prepared for use in this invention by dehydrating 10 grams of indium oxalate hexahydrate at 100° C. in a vacuum overnight. The oxalate was then placed in a glass reaction vessel and the container flushed with argon. The oxalate was heated to 200° C. in order to drive off any residual water and at the same time, the argon stream was replaced with a stream of phosphine flowing at 100 cc. per minute. The temperature was then raised to 250° C. for 4 hours, then to 270° C. for one hour, and then to 300° C. for another hour. This reaction produced a free gray powder with a metallic luster. The phosphorus and other volatile reaction products were then flushed out of the system with argon and 4.8 grams of indium phosphide of spectroscopic purity were recovered and stored under argon for subsequent utilization.

Example II

Indium acetylacetonate was made by reacting indium nitrate and pentanedione 2-4. This material was purified by vacuum sublimation and zone refining, and finely ground in a glass mortar. A glass reactor was charged with 20 grams of the purified, finely-ground indium acetylacetonate and a 100 cc. per minute stream of phosphine passed through the powder. During this time, the powder was raised to a temperature of 175° C., and the flow rate of phosphine maintained for 6 hours. After this, the temperature was raised to 250° C. for 2 hours and then to 300° C. for 15 minutes. The volatile reaction products were flushed out of the system and the free gray powdered indium phosphide collected. A yield of 6.6 grams, 95% of theoretical, of semiconductive purity was obtained and stored under argon for future use.

Example III

A glass reactor was charged with 25 grams of powdered, purified indium formate and flushed with argon. The argon was replaced with a 100 cc. per minute flow of phosphine, this flow rate of phosphine being low enough not to cause dusting of the powdered formic acid. The reactants were heated from room temperature to 200° C. in 1 hour; from 200° C. to 230° C. in 4 hours; and from 230° C. to 250° C. in 1 hour. The powder was stirred intermittently during the heating and upon completion of the reaction was gray-black. The reactor was purged of volatile reaction products with argon and 14.3 grams of indium phosphide, of semiconductive purity, were recovered therefrom and stored under argon for future use.

Example IV

Indium formate was prepared for use in making pure indium phosphide by treating 45 grams of indium acetylacetonate, made and purified according to Example II, with formic acid. This treatment consisted of extracting the powdered indium acetylacetonate with formic acid. After 10 extractions in a Soxhlet apparatus, the formic acid containing the most pentanedione 2-4 was discarded and replaced with fresh stock. The powder was then subjected to 20 more extractions which resulted in a yield of 25 grams of indium formate, about 95% of theoretical. This resulting indium formate was then reacted with phosphine to produce indium phosphide according to Example III.

Example V

A reaction vessel was charged with 8 grams of trimethyl indium which was introduced by subliming and condensing the trimethyl indium. The trimethyl indium was dissolved in 100 milliliters of dry toluene and the solution cooled to about 0° C. in an ice bath. Phosphine was bubbled through the solution causing a white solid to precipitate therefrom. After the solid stopped precipitating, the phosphine flow was stopped and the precipitate collected and dried. The white solid was then heated very slowly to about 275° C. during which heating the solid turned from white to yellow and then to gray-black. A yield of 7 grams, 97% indium phosphide, of semiconductive purity was obtained.

Indium phosphide made according to these examples, as well as material made according to the teachings of this invention using reactants other than the organic indium compounds shown in these examples, was formed into single crystals and these tested for their semiconductor properties. This material was found to be n-type with a resistivity of 0.03 ohm-centimeter, which corresponds to an impurity concentration of approximately $10^{17}$ atoms per cubic centimeter. If desired, the reactants described herein may be subjected to further suitable purification steps by which the purity of the product may be increased substantially. With these further purifications, materials having resistivities in the range of several hundred ohm-centimeters may be conveniently obtained.

What is claimed is:

1. The process of preparing indium phosphide which comprises reacting at least one organic indium compound, which forms reaction products by the replacement of indium with hydrogen which are all volatile at the reaction temperature, with phosphine at less than about 300° C. in a container; removing the volatile reaction products; and recovering indium phosphide.

2. The process of preparing indium phosphide which comprises reacting at least one indium salt of a compound selected from the group consisting of alkyls, carboxylic acids and monoenols, which form reaction products by the replacement of indium with hydrogen which are all volatile at the reaction temperature, with phosphine at less than about 300° C. in a reaction vessel; removing the volatile reaction products; and recovering indium phosphide.

3. The process of preparing indium phosphide which comprises reacting indium acetylacetonate with phosphine at less than 300° C. in a reaction vessel; removing the volatile reaction products; and recovering indium phosphide.

4. The process of preparing indium phosphide which comprises reacting indium formate with phosphine at less than 300° C. in a container; removing the volatile reaction products; and recovering indium phosphide.

5. The process of producing indium phosphide which comprises reacting indium oxalate with phosphine at less than 300° C. in a container; removing the volatile reaction products; and recovering indium phosphide.

6. The process of producing indium phosphide which comprises dissolving trimethyl indium in a solvent selected from the group consisting of benzene and toluene; bubbling phosphine through said solution thereby forming a precipitate; drying said precipitate; heating said dried precipitate to an elevated temperature less than 300° C.; and recovering indium phosphide.

References Cited in the file of this patent

UNITED STATES PATENTS 2,871,100    Guire et al. _____ Jan. 27, 1959

OTHER REFERENCES

Comprehensive Treatise on Inorganic and Theoretical Chemistry, Mellor, Longmans, Green and Co., N.Y., 1928, pp. 833, 834, 849, vol. 8.